United States Patent Office 3,003,740
Patented Oct. 10, 1961

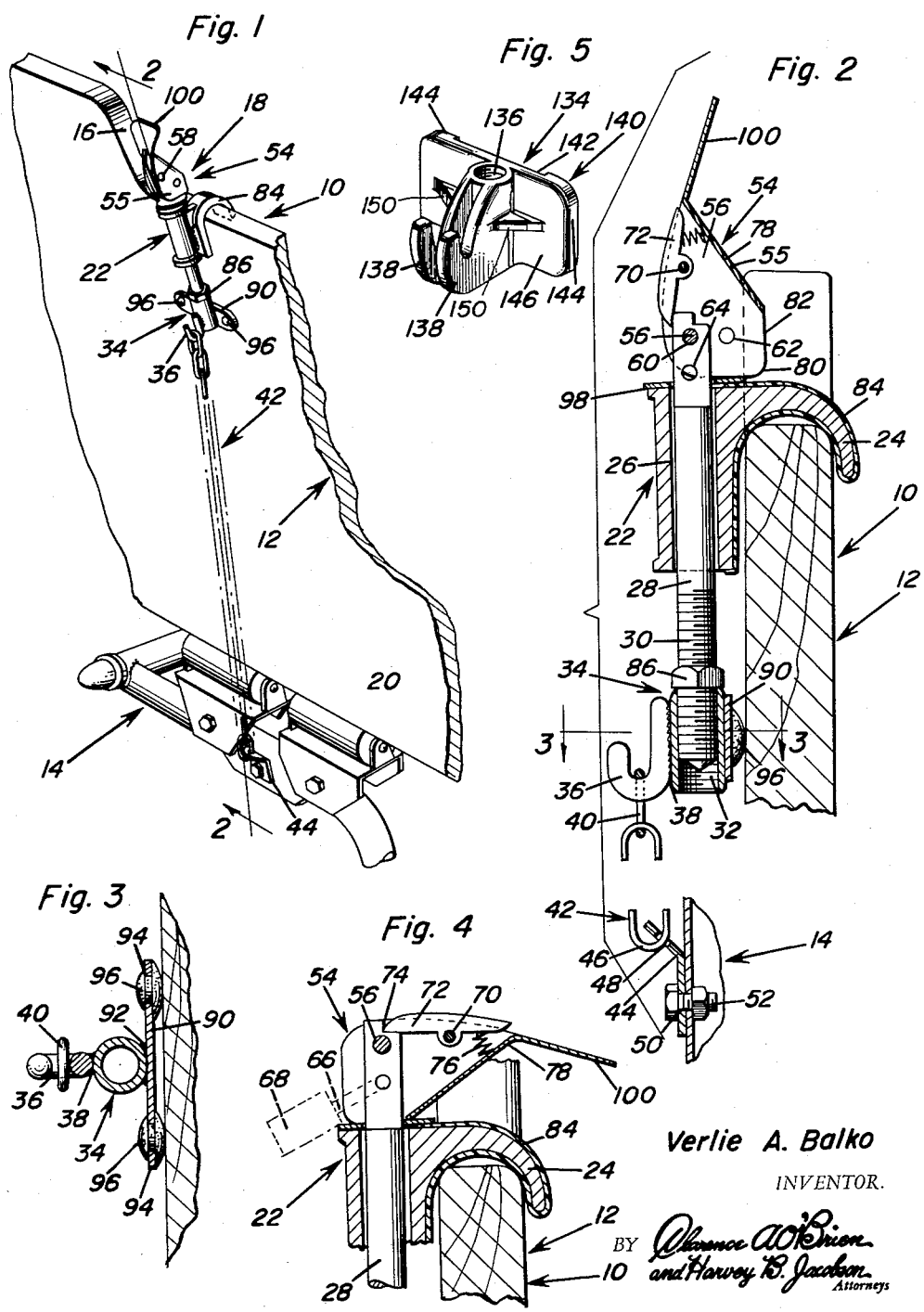

3,003,740
BOAT TRAILER TIE-DOWN STRAP
Verlie A. Balko, 706 Lindoo Ave., E., Ladysmith, Wis.
Filed July 11, 1960, Ser. No. 41,852
9 Claims. (Cl. 248—361)

This invention relates to a novel and useful boat trailer tie-down strap, and more particularly to a tie down strap which is specifically adapted for rigidly securing the rear end of a boat on the supporting rollers of a trailer on which it is disposed.

Although boat trailers are equipped with winches on the forward end thereof for rigidly securing a boat positioned on the trailer in position longitudinally of the latter, the tie-down straps heretofore used to prevent the rear end of the boat from lifting above the rear end of the trailer have proven ineffective inasmuch as most of these tie-down straps have been resilient to a certain degree. Although a resilient strap may be sufficient for the purpose intended while the trailer is travelling over relatively smooth roads, if the roads immediately adjacent the water on which the boat is to be used are rough, a boat trailer equipped with resilient tie-down straps must be moved slowly inasmuch as rough roads will otherwise cause the rear end of the boat to bounce around on the rear of the trailer. By providing a rigid tensioning member and a means by which the tensioning member may be secured between the transom of the boat and portions of the boat trailer disposed immediately therebelow and providing a means whereby tension may be placed upon the tensioning member as desired, a boat secured to a trailer in this manner will be secured to the trailer so that the boat and trailer are combined into one unit thus eliminating the boat shifting or bouncing in position relative to the trailer.

The boat trailer tie-down strap of the instant invention includes the provision of a clamp body having a downwardly opening and laterally offset hook member adapted to embrace the upper edges of a boat transom. The clamp body has a vertical opening formed therethrough and an actuator rod is slidingly disposed through the opening for vertical movement relative to the clamp body. The lower end of the rod is externally threaded and threadedly engaged within a sleeve member on which there is secured an upwardly opening hook member. A tensioning member in the form of a length of link chain is secured to the upwardly opening hook member on the sleeve and also to a part of the trailer on which the boat is disposed immediately below the transom of the boat. Cam means is carried by the upper end of the rod extending through the clamp body for effecting upward longitudinal movement of the rod and thereby to tension the link chain and draw the rear end of the boat into tight frictional engagement with the trailer on which it is supported.

The cam means carried by the upper end of the rod is provided with an over-center position for maintaining the cam means in position to tension the length of link chain and is additionally provided with latch means engageable with the rod for releasably retaining the cam means in position to tension the length of link chain against accidental release of the cam means.

Although other types of tie-down straps have been devised for rigidly securing the rear end of a boat to the trailer on which it is supported, most of these strap assemblies have not been provided with means for effecting straightline tensioning of the tensioning member secured between the trailer and the boat transom. The straightline movement of the rod or actuator for the link chain tension member enables tension to be placed on the latter after the boat is properly positioned on the trailer and without effecting movement of the boat relative to the trailer while increasing the tension on the tensioning member.

The main object of this invention is to provide a boat tie-down strap provided with an actuator for effecting straightline movement and tensioning of the tension member secured between the boat and the boat trailer.

A further object of this invention, in accordance with the immediately preceding object, is to provide a means whereby the tie-down strap may be readily adjusted in over-all length.

Still another object of this invention is to provide a means whereby a lock may be engaged with the tie-down strap to lock it in position applying tensioning to the tensioning member secured between a boat and the trailer on which the boat is positioned whereby unauthorized removal of the boat from the trailer will be prohibited.

A final object to be specifically enumerated herein is to provide a boat trailer tie-down strap which will conform to conventional forms of manufacture, be of simple construction and easy to operate so as to provide a device that will be economically feasible, long lasting and operable by substantially every person capable of unloading and loading a boat on a boat trailer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a boat transom and the rear portion of a boat trailer on which the boat is positioned, the tie-down strap of the instant invention being shown secured between the upper surfaces of the boat transom and the portions of the boat trailer disposed immediately therebeneath;

FIGURE 2 is a longitudinal vertical sectional view taken substantially upon the plane indicated by the section line 2—2 of FIGURE 1, parts of the boat transom and trailer being broken away;

FIGURE 3 is a horizontal sectional view taken substantially upon the plane indicated by the section line 3—3 of FIGURE 2;

FIGURE 4 is a vertical sectional view similar to that of FIGURE 2 but showing the upper portion of the tie-down strap and with the cam means thereof shown in position to tension the link chain secured between the boat transom and the trailer; and FIGURE 5 is a perspective view of a modified form of a component of the invention.

Referring now more specifically to the drawings the numeral 10 generally designates a portion of a boat transom comprising a part of the boat generally designated by the reference numeral 12 which is shown positioned on the rear end of a boat trailer generally designated by the reference numeral 14.

The boat transom is provided with an upwardly opening and transversely extending recess 16 in which an outboard motor (not shown) is adapted to be secured.

It is to be understood that the tie-down strap generally designated by the reference numeral 18 and comprising the instant invention is to be used in pairs spaced transversely of the boat 12 in order that the opposite sides of the boat 12 will be secured in tight frictional engagement with the supporting rollers 20 of the trailer 14. In this manner, rocking of the boat 12 about its longitudinal axis will be eliminated.

The tiedown strap 18 includes a clamp body generally referred to by the reference numeral 22 which has a downwardly opening and laterally offset hook member 24 formed integrally therewith. The clamp body 22 is provided with a vertically extending opening or bore 26 through which the upper end of an actuator rod 28 is slidably received for vertical sliding movement. The lower end of the rod 28 is provided with a threaded shank portion 30 and is threadedly engaged within a threaded bore 32 formed in the sleeve member generally referred to by the reference numeral 34. The sleeve member 34 has an upwardly opening hook member 36 rigidly secured thereto in any convenient manner such as by welding 38 and the uppermost link 40 of the link chain tensioning member generally designated by the reference numeral 42 is engaged with the hook 36.

A mounting member 44 is secured to the lowermost link 46 of the link chain tension member 42 by means of the aperture 48 formed therein through which a portion of the link 46 is disposed. The lower end of the mounting member 44 has an aperture 50 formed therein by which the mounting member 44 may be secured to an apertured portion of the trailer 14 in any convenient manner such as by fastener 52.

A cam means generally referred to by the reference numeral 54 is pivotally secured to the upper end of the rod 28 by means of pivot pin 56. The cam means 54 includes a generally U-shaped member 55 whose legs 57 are provided with aligned apertures 58. The upper end of the rod 28 is provided with an aperture 60 registerable with the apertures 58 and the pivot pin 56 is passed through the apertures 58 and 60 to pivotally secure the U-shaped member 55 to the upper end of the rod 28. The legs 57 are provided with additional aligned apertures 62 registerable with the additional aperture 64 formed in the rod 28. When the U-shaped member 55 is positioned in FIGURE 4 of the drawings, the shank 66 of the lock 68 may be secured through the aligned apertures 62 and 64.

The U-shaped member 55 also has a pivot pin 70 secured between its legs 57 by which latch member 72 is pivotally secured to the U-shaped member 55. As can be most clearly seen in FIGURE 4 of the drawings, the upper end of the rod 28 is provided with a notch 74 in which one end of the latch member 72 is seated by means of spring 76 disposed between the other end of the latch member 72 and the bight portion 78 of the U-shaped member 55. In this manner, the U-shaped member 55 is maintained in a position tensioning the link chain 42.

The free ends of the legs 57 are provided with curved outer cam surfaces 80 which extend progressively further away from the pivot pin 56 and terminate in substantially flat and parallel surfaces 82 tangent to the pivot pin 56.

The hook member 24 is provided with a resilient coating 84 of any desirable material for reducing the possibility of the hook member 24 scratching or marring the transom 10.

A jam nut 86 is also threadedly engaged on the threaded shank portion of the rod 28 and may be frictionally engaged with the upper end of the sleeve 34 to maintain the latter in adjusted positions longitudinally of the rod 28. The sleeve 34 is provided with a transversely extending abutment plate 90 which is secured to the sleeve 34 in any convenient manner such as by welding 92. The abutment plate 90 is secured to one side of the sleeve 34 and extends beyond the opposite sides thereof. The outermost ends of the abutment plate 90 are provided with apertures 94 through which resilient abutment members 96 are secured. The abutment members 96 project from the side of the abutment plate 90 remote from the sleeve 34 to engage the adjacent surfaces of the transom 10.

If it is desired, a friction washer 98 may be positioned between the cam surfaces 80 and 82 of the U-shaped member 55 and the upper end of the body 20. It is to be understood that the U-shaped member 55 may be conveniently produced by stamping processes and that the hook member 22 may be formed most conveniently by casting processes.

The bight portion 78 of the U-shaped member 55 is provided with an angulated handle portion 100 and it will be noted that this handle portion 100 may be manipulated to rotate the U-shaped member 55 and effect vertical sliding movement of the rod 28 to increase or decrease the tension on the tensioning member 42.

In operation, the link chain 42 may be semi-permanently secured to the trailer 14 in the manner illustrated and when it is desired to secure the rear end of the boat 12 in tight frictional engagement with the supporting rollers 20 of the trailer 14, the handle portion 100 of the U-shaped element 55 is rotated to an upward position and the hook member 24 is engaged in embracing relation with the upper surfaces of the recess 16 formed in the transom 10. The uppermost link 40 may then be engaged with the hook member 36 and the handle 100 may be pushed forwardly of the boat 12 in order to cam the rod 28 upwardly to place tension on the link chain 42. As the U-shaped member 55 is pivoted to a position shown in FIGURE 4 of the drawings, the latch element 72 will engage the notch 74 in the upper end of the rod 28 to releasably retain the U-shaped member 55 in position to tension the link chain 42.

The flat surfaces 82 comprise an over-center position for the cam means 54 inasmuch as portions of the flat surfaces 82 are closer to the pivot pin 56 than some of the portions of the curved surfaces 80.

If it is desired to lock the cam means 54 in position to retain tension on the tensioning member 42, the lock 68 may have its hasp 66 secured through the registered apertures 62 and 64. Then, when it is desired to release the tension on the link chain 42, the end of the latch element 72 adjacent the spring 76 may be depressed to disengage the latch elements 72 from the notch 74 whereby the handle 100 may be manipulated to effect rotation of the U-shaped member 55 from that position illustrated in FIGURE 4 of the drawings to that position illustrated in FIGURE 2 of the drawings.

With attention now directed to FIGURE 5 of the drawings there will be seen a modified form of sleeve member generally referred to by the reference numeral 134. The sleeve member 134 has a threaded bore 136 formed therethrough for receiving the threaded shank portion 30 of the rod 28. A pair of parallel hook members 138 are carried by the sleeve member 134 and project from one side thereof and a transversely extending abutment plate generally referred to by the reference numeral 140 is carried by the opposite side of the sleeve member 134 for abutting engagement with the outer surface of the transom 10. The plate 140 is provided with a centrally disposed vertically extending recess 142 in its face remote from the sleeve member thereby defining a pair of spaced abutment surfaces 144 on the plate 140 for engagement with the transom 10. The plate 140 is covered with a suitable resilient covering 146 for providing an abutment not likely to mar the finish of the transom 10.

A pair of triangular plates 150 are secured in any convenient manner between the remote surfaces of the hook members and the adjacent surfaces of the plate 140 to afford maximum support for the hooks 138. It is to be understood that the hooks 138 are of such configuration to readily engage a selected link of the chain 42. Further, the sleeve member 134 is to be used in lieu of the sleeve member 34 as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A boat trailer tie-down strap assembly comprising a clamp body including a downwardly opening and laterally offset hook member adapted to embrace the upper edges of a boat transom, an actuator, means mounting said actuator on said body for vertical sliding movement relative to said body, a tension member, attaching means on the lower end of said actuator engaging one end of said tension member, means on the other end of said tension member adapted for securement to a trailer frame, and cam means operatively connected between said actuator and clamp body for effecting upward movement of the former relative to the latter, said actuator including an elongated rod, said mounting means including a vertical opening formed through said body slidably and longitudinally receiving said rod therethrough whereby said cam means effects straightline axial movement of said rod, a threaded shank portion on the lower end of said rod, an internally threaded sleeve threadingly secured on said shank portion, said attaching means carried by said sleeve.

2. The combination of claim 1 wherein said sleeve includes an abutment plate secured to one side thereof and extending transversely of and beyond opposite sides of said sleeve, and resilient abutment members carried by opposite ends of said plate and projecting from the side thereof remote from said sleeve adapted for engagement with the rear outer face of a boat transom.

3. The combination of claim 2 including a jam nut threadingly secured on said shank portion above said sleeve for frictional engagement with the upper end of the latter.

4. The combination of claim 3 wherein said tension member comprises a length of link chain.

5. The combination of claim 1 wherein said cam means includes an over-center position for retaining tension on said tension member.

6. The combination of claim 5 wherein said cam means includes means releasably securing said cam means in said over-center position.

7. The combination of claim 1 wherein said cam means includes a generally U-shaped member, means pivotally securing the upper end of said rod between the legs of said U-shaped member, a handle on said U-shaped member for effecting its rotation, corresponding end portions of said legs including curved cam surfaces extending progressively further away from the axis of rotation of said U-shaped member and engaging the uppermost end of said clamp body adjacent said opening.

8. The combination of claim 7 wherein the ends of said cam surfaces remote from said pivotal securing means terminate in substantially flat surfaces tangent to the axis of rotation of said U-shaped member.

9. The combination of claim 8 wherein said U-shaped member includes latch means releasably securing said U-shaped member in position with said flat surfaces in engagement with the upper end of said body.

References Cited in the file of this patent

UNITED STATES PATENTS

| | | |
|---|---|---|
| 375,538 | Crawford | Dec. 27, 1887 |
| 420,701 | Schaller | Feb. 4, 1890 |
| 1,038,000 | Schaeffer | Sept. 10, 1912 |
| 2,825,522 | Bolmes | Mar. 4, 1958 |

FOREIGN PATENTS

| | | |
|---|---|---|
| 7,676 | Great Britain | Apr. 16, 1895 |